(12) United States Patent
O et al.

(10) Patent No.: US 12,541,567 B2
(45) Date of Patent: Feb. 3, 2026

(54) SYSTOLIC ARRAY AND ACCELERATOR INCLUDING THE SAME

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Seongil O, Suwon-si (KR); Wonwoo Ro, Seoul (KR); Seihoon Park, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 1098 days.

(21) Appl. No.: 17/540,913

(22) Filed: Dec. 2, 2021

(65) Prior Publication Data

US 2022/0350861 A1    Nov. 3, 2022

(30) Foreign Application Priority Data

May 3, 2021  (KR) .......................... 10-2021-0057124

(51) Int. Cl.
*G06F 17/16* (2006.01)
*G06F 15/80* (2006.01)
*G06F 17/15* (2006.01)

(52) U.S. Cl.
CPC .......... *G06F 17/16* (2013.01); *G06F 15/8046* (2013.01); *G06F 17/15* (2013.01)

(58) Field of Classification Search
CPC ...... G06F 15/8046; G06F 17/15; G06F 17/16; G06F 17/153
See application file for complete search history.

(56) References Cited

U.S. PATENT DOCUMENTS

| | | | |
|---|---|---|---|
| 6,721,462 B2 | 4/2004 | Okabayashi et al. | |
| 8,281,265 B2 | 10/2012 | Vorbach et al. | |
| 10,698,974 B2 | 6/2020 | Phelps et al. | |
| 11,308,026 B1* | 4/2022 | Volpe | G06F 7/53 |
| 11,625,453 B1* | 4/2023 | Meyer | G06F 15/8046 |
| | | | 706/15 |
| 2001/0022859 A1 | 9/2001 | Okabayashi et al. | |

(Continued)

FOREIGN PATENT DOCUMENTS

| | | |
|---|---|---|
| CN | 110852422 A | 2/2020 |
| KR | 1020190065144 A | 6/2019 |

*Primary Examiner* — Andrew Caldwell
(74) *Attorney, Agent, or Firm* — Sughrue Mion, PLLC

(57) ABSTRACT

A systolic array and an accelerator including the same are disclosed. The systolic array may include n×n processing elements disposed in an n×n matrix (n being an integer equal to or more than at least 4), wherein the n×n processing elements perform a first convolution operation on first input data of row vectors of a first input n×n matrix and first weight data of column vectors of a first weight n×n matrix to generate n first output data, or each of at least k partial systolic arrays (k being an integer equal to or more than at least 4) constituted by dividing the n×n processing elements includes m×m processing elements disposed in an m×m matrix (m being an integer less than n and equal to or more than at least 2).

20 Claims, 14 Drawing Sheets

(56) References Cited

U.S. PATENT DOCUMENTS

| | | |
|---|---|---|
| 2010/0070671 A1 | 3/2010 | Vorbach et al. |
| 2018/0336163 A1 | 11/2018 | Phelps et al. |
| 2019/0244084 A1 | 8/2019 | Cho et al. |
| 2020/0150958 A1 | 5/2020 | Ahmed |
| 2020/0175355 A1 | 6/2020 | Chung et al. |
| 2020/0285605 A1 | 9/2020 | Nam |

* cited by examiner

SYSTOLIC ARRAY AND ACCELERATOR INCLUDING THE SAME

CROSS-REFERENCE TO THE RELATED APPLICATION

This application is based on and claims priority from Korean Patent Application No. 10-2021-0057124, filed on May 3, 2021, in the Korean Intellectual Property Office, the disclosure of which is incorporated herein by reference in its entirety.

BACKGROUND

1. Field

The disclosure relates to a systolic array and an accelerator including the same.

2. Description of the Related Art

An accelerator including a systolic array is used to perform convolutional-neural-network (CNN)-based operation, such as convolution operation. The systolic array may include a plurality of processing elements disposed in a matrix. For instance, the systolic array may include a plurality of hardware structures including data processing units (DPU) arranged in a matrix. In general, the size of a matrix of the systolic array may be fixed to perform a convolution operation.

SUMMARY

The exemplary embodiments of the disclosure provide a systolic array capable of performing a convolution operation by variably reconfiguring the size of a matrix of the systolic array and an accelerator including the same.

The disclosure is not limited to the aforementioned objects, and other unmentioned objects will be clearly understood by those skilled in the art based on the following description of the disclosure.

According to an aspect of the disclosure, there is provided a systolic array including: a plurality of processing elements provided in an n×n matrix, the plurality of processing elements configured to perform: a first convolution operation on first input data of row vectors of a first input n×n matrix and first weight data of column vectors of a first weight n×n matrix to generate n first output data, or divide the plurality of processing elements into k partial systolic arrays, each of the k partial systolic arrays comprising a plurality of sub-processing elements provided in an m×m matrix, and perform a second convolution operation on second input data of row vectors of k second input m×m matrices each corresponding one the k partial systolic arrays and second weight data of column vectors of k second weight m×m matrices each corresponding one the k partial systolic arrays to generate m second output data, wherein n is an integer greater than or equal to 4, wherein k is an integer greater than or equal to 4, and wherein m is an integer less than n, and m is greater than or equal to 2.

According to another aspect of the disclosure, there is provided an accelerator including: a systolic array comprising a plurality of processing elements provided in an n×n matrix, the plurality of processing elements configured to perform: in response to a control signal, a first convolution operation on first input data of n row vectors of a first input n×n matrix and first weight data of n column vectors of a first weight n×n matrix to generate n first output data, or divide the plurality of processing elements into k partial systolic arrays, each of the k partial systolic arrays comprising a plurality of sub-processing elements provided in an m×m matrix, and perform a second convolution operation on second input data of row vectors of k second input m×m matrices each corresponding one the k partial systolic arrays and second weight data of column vectors of k second weight m×m matrices each corresponding one the k partial systolic arrays to generate m second output data, wherein n is an integer greater than or equal to 4, wherein k is an integer greater than or equal to 4, and wherein m is an integer less than n, and m is greater than or equal to 2; an accumulator configured to accumulate the n first output data to generate first convolution result data or to accumulate the m second output data generated from each of the k partial systolic arrays to generate at least k second convolution result data in response to the control signal; an input data generator configured to generate the first input data of the n row vectors of the first input n×n matrix or to generate the second input data of the m row vectors of each of the at least k second input m×m matrices in response to the control signal; and a weight data generator configured to generate the first weight data of the n column vectors of the first weight n×n matrix or to generate the second weight data of the m column vectors of each of the at least k second weight m×m matrices in response to the control signal.

DETAILED DESCRIPTION OF EXEMPLARY EMBODIMENTS

Hereinafter, a systolic array and an accelerator including the same according to embodiments of the disclosure will be described with reference to the accompanying drawings.

Figure 1:
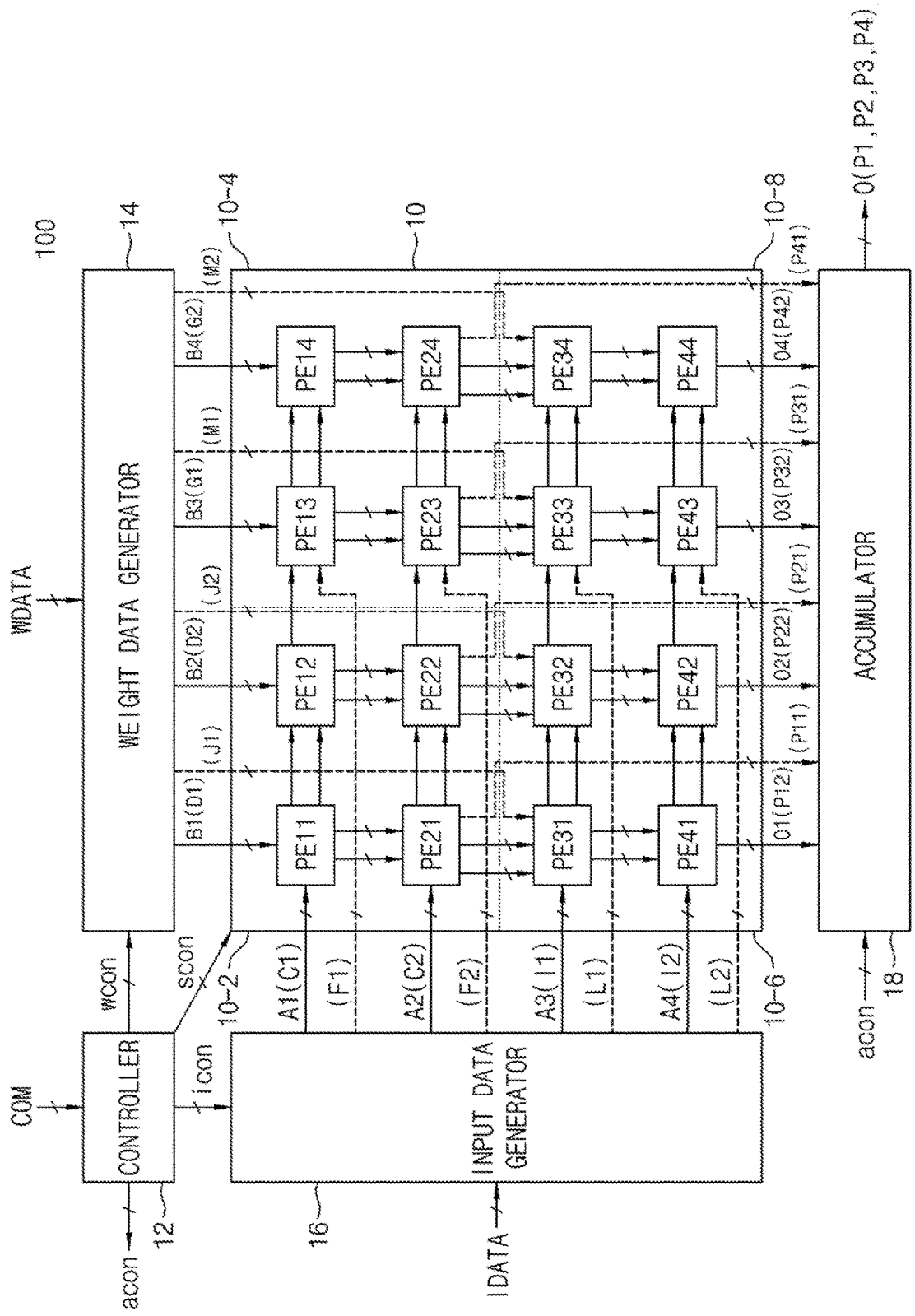
FIG. 1 is a block diagram of an accelerator according to an example embodiment of the disclosure.

FIG. 1 is a block diagram of an accelerator according to an example embodiment of the disclosure. The accelerator 100 may include a systolic array 10, a controller 12, a weight data generator 14, an input data generator 16, and an accumulator 18. The systolic array 10 may include 16 processing elements PE11 to PE44 arranged in a matrix, for example a 4×4 matrix. The systolic array 10 may be divided into four partial systolic arrays 10-2, 10-4, 10-6, and 10-8, and the four partial systolic arrays 10-2, 10-4, 10-6, and 10-8 may respectively include four processing elements PE11, PE12, PE21, and PE22, PE13, PE14, PE23, and PE42, PE31, PE32, PE41 and PE43 and PE33, PE34, PE43 and PE44, each of which is arranged in a 2×2 matrix. According to various example embodiments, the systolic array may include a plurality of hardware structures including data processing units (DPU) arranged in a matrix. For example, the processing elements may be hardware electronic components and/or electronic circuitry.

The function of each of the blocks shown in FIG. 1 will be described.

In response to a systolic array control signal scon, the systolic array 10 may perform a first convolution operation on first input data A1 to A4 of row vectors of a first input 4×4 matrix A and first weight data B1 to B4 of column vectors of a first weight 4×4 matrix B to generate four first output data O1 to O4, or the four partial systolic arrays 10-2, 10-4, 10-6, and 10-8 may perform a second convolution operation on second input data C1 and C2, F1 and F2, I1 and I2, and L1 and L2 of row vectors of four second input 2×2 matrices C, F, I, and L and second weight data D1 and D2, G1 and G2, J1 and J2, and M1 and M2 of row vectors of second weight 2×2 matrices D, G, J, and M to generate output data P11 and P21, P31 and P41, P12 and P22, and P32 and P42, respectively.

The systolic array 10 may receive the first input data A1 to A4 and the first weight data B1 to B4, and the 16 processing elements PE11 to PE44 may perform the first convolution operation to generate the four first output data O1 to O4.

During the first convolution operation, among the 4×4 processing elements PE11 to PE44, the processing elements PE11, PE21, PE31, and PE41 provided in a first column may respectively receive the first input data A1, A2, A3, and A4 of the four row vectors of the first input matrix A, the processing elements PE11, PE12, PE13, and PE14 provided in a first row may respectively receive the first weight data B1, B2, B3, and B4 of the column vectors of the first weight matrix B, the processing elements other than the processing elements PE11, PE21, PE31, and PE41 provided in the first column may respectively receive the first input data A1, A2, A3, and A4 applied through the front-end processing elements provided at the left side, and the processing elements other than the processing elements PE11, PE12, PE13, and PE14 provided in the first row may respectively receive the first weight data B1, B2, B3, and B4 applied through the front-end processing elements provided at the up side (i.e., an upstream side). In addition, the 4×4 processing elements PE11 to PE44 may respectively multiply the first input data A1, A2, A3, and A4 and the first weight data B1, B2, B3, and B4 to obtain first multiplication results, may accumulate the first multiplication results to obtain a first partial accumulation result, may add the first partial accumulation result and a second partial accumulation result transmitted from the front-end processing elements provided at the upside to obtain a third partial accumulation result, and may transmit the third partial accumulation result to the rear-end processing elements provided at the downside (i.e., a downstream side).

The partial systolic array 10-2 may receive the second input data C1 and C2 and the second weight data D1 and D2, and the four processing elements PE11, PE12, PE21, and PE22 may perform the second convolution operation to generate the two second output data P11 and P21. The partial systolic array 10-4 may receive the second input data F1 and F2 and the second weight data G1 and G2, and the four processing elements PE13, PE14, PE23, and PE24 may perform the second convolution operation to generate the two second output data P31 and P41. The partial systolic array 10-6 may receive the second input data I1 and I2 and the second weight data J1 and J2, and the four processing elements PE31, PE32, PE41, and PE42 may perform the second convolution operation to generate the two second output data P12 and P22. The partial systolic array 10-8 may receive the second input data L1 and L2 and the second weight data M1 and M2, and the four processing elements PE33, PE34, PE43, and PE44 may perform the second convolution operation to generate the two second output data P32 and P42.

As an example, during the second convolution operation, among the partial systolic arrays 10-2, 10-4, 10-6, and 10-8, the processing elements PE13 and PE23 and PE33 and PE43 disposed in a first column of the 2×2 processing elements PE13, PE 14, PE23 and PE24 and PE33, PE34, PE43 and PE44 of the partial systolic arrays 10-4 and 10-8, which do not include the four processing elements PE11, PE21, PE31, and PE41 disposed in the first column of the 4×4 processing elements PE11 to PE44, may not respectively receive the second input data C1 and C2 and I1 and I2 transmitted through the front-end processing elements disposed at the left side, but instead may respectively receive the second input data F1 and F2 and L1 and L2 of the row vectors of the second input 2×2 matrices F and L. Among the partial systolic arrays 10-2, 10-4, 10-6, and 10-8, the processing elements PE31 and PE32 and PE33 and PE43 disposed in a first row of the 2×2 processing elements PE31, PE32, PE41 and PE42 and PE33, PE34, PE43 and PE44 of the partial systolic arrays 10-6 and 10-8, which do not include the four processing elements PE11, PE12, PE13, and PE14 disposed in the first row of the 4×4 processing elements PE11 to PE44, may not respectively receive the second weight data D1 and D2 and G1 and G2 transmitted through the front-end processing elements disposed at the upside but may respectively receive the second weight data J1 and J2 and M1 and M2 of the column vectors of the second weight 2×2 matrices J and M. Among the 2×2 processing elements PE11 to PE22, PE13 to PE24, PE31 to PE42, and PE33 to PE44 of the partial systolic arrays 10-2, 10-4, 10-6, and 10-8, the processing elements other than the processing elements PE11 and PE21, PE13 and PE23, PE31 and PE41, and PE33 and PE43 disposed in the first column may receive the second input data C1 and C2, F1 and F2, I1 and I2, and L1 and L2 applied through the front-end processing elements disposed at the left side. Among the 2×2 processing elements PE11 to PE22, PE13 to PE24, PE31 to PE42, and PE33 to PE44 of the partial systolic arrays 10-2, 10-4, 10-6, and 10-8, the processing elements other than the processing elements PE11 and PE12, PE13 and PE14, PE31 and PE32, and PE33 and PE34 disposed in the first row may receive the second weight data D1 and D2, G1 and G2, J1 and J2, and M1 and M2 applied through the front-end processing elements disposed at the upside. The 2×2 processing elements of the partial systolic arrays 10-2, 10-4, 10-6, and 10-8 may respectively multiply the second input data C1 and C2, F1 and F2, I1 and I2, and L1 and L2 and the second weight data D1 and D2, G1 and G2, J1 and J2, and M1 and M2 to obtain second multiplication results, may accumulate the second multiplication results to obtain a fourth partial accumulation result, may accumulate the fourth partial accumulation result and a fifth partial accumulation result transmitted from the front-end processing elements disposed at the upside to obtain a sixth partial accumulation result, and may or may not transmit the sixth partial accumulation result to the rear-end processing elements disposed at the downside.

As another example, during the second convolution operation, the second weight data D1 and D2, G1 and G2, J1 and J2, and M1 and M2 of the second weight matrices D, G, J, and M may be stored in advance in the 2×2 processing elements PE11 to PE22, PE13 to PE24, PE31 to PE42, and PE33 to PE44 of the partial systolic arrays 10-2, 10-4, 10-6, and 10-8, respectively. In this case, unlike what is shown in FIG. 1, among the partial systolic arrays 10-2, 10-4, 10-6, and 10-8, the processing elements PE31 and PE32 and PE33 and PE34 disposed in the first row of the 2×2 processing elements PE31 to PE41 and PE33 to PE44 of the partial systolic arrays 10-6 and 10-8, which do not include the four processing elements PE11, PE12, PE13, and PE14 disposed in the first row of the 4×4 processing elements PE11 to PE44, may respectively receive the second weight data J1 and J2 and M1 and M2 transmitted through the front-end processing elements disposed at the upside. That is, the second weight data D1 and D2 and G1 and G2 of the second weight matrices D and G may be applied, and then the second weight data J1 and J2 and M1 and M2 of the second weight matrices J and M may be applied.

In response to a command signal COM, the controller 12 may generate a systolic array control signal scon, an input data control signal icon, a weight data control signal wcon, and an accumulator control signal acon. For example, the systolic array control signal scon, the input data control signal icon, and the weight data control signal wcon may be control signals related to the size of the weight matrix.

The weight data generator 14 may store weight data WDATA applied from the outside and may generate the first weight data B1 to B4 or the second weight data D1 and D2, G1 and G2, J1 and J2, and M1 and M2 in response to the weight data control signal wcon. The weight data generator 14 may generate the first weight data B1 to B4 in the case in which the size of the weight matrix is 4×4, and may generate the second weight data D1 and D2, G1 and G2, J1 and J2, and M1 and M2 in the case in which the size of the weight matrix is 2×2. As an embodiment, the weight data generator 14 may be a memory. The memory may be a dynamic random access memory (DRAM).

The input data generator 16 may store input data IDATA applied from the outside and may generate the first input data A1 to A4 or the second input data C1 and C2, I1 and I2, F1 and F2, and L1 and L2 in response to the input data control signal icon. The input data generator 16 may generate the first input data A1 to A4 in the case in which the size of the input matrix is 4×4, and may generate the second input data C1 and C2, I1 and I2, F1 and F2, and L1 and L2 in the case in which the size of the input matrix is 2×2. As an embodiment, the input data generator 16 may be a memory. The weight data generator 14 and the input data generator 16 may be configured as a single memory. The memory may be a DRAM.

In response to the accumulator control signal acon, the accumulator 18 may accumulate the first output data O1 to O4 to generate first convolution result data O, or may accumulate the second output data P11 and P21, P12 and P22, P31 and P41, and P32 and P42 to generate four second convolution result data P1, P2, P3, and P4. Although the systolic array 10 is shown as being configured in a 4×4 matrix in the embodiment shown in FIG. 1, the systolic array 10 may be configured in an n×m matrix (each of n and m being an integer equal to or more than 5 and n and m being equal to or different from each other). In addition, although the construction in which the systolic array 10 is divided into the four partial systolic arrays 10-2, 10-4, 10-6, and 10-8 configured to perform the second convolution operation is shown, the systolic array 10 may be divided into more than four partial systolic arrays configured to perform the second convolution operation.

Figure 2:
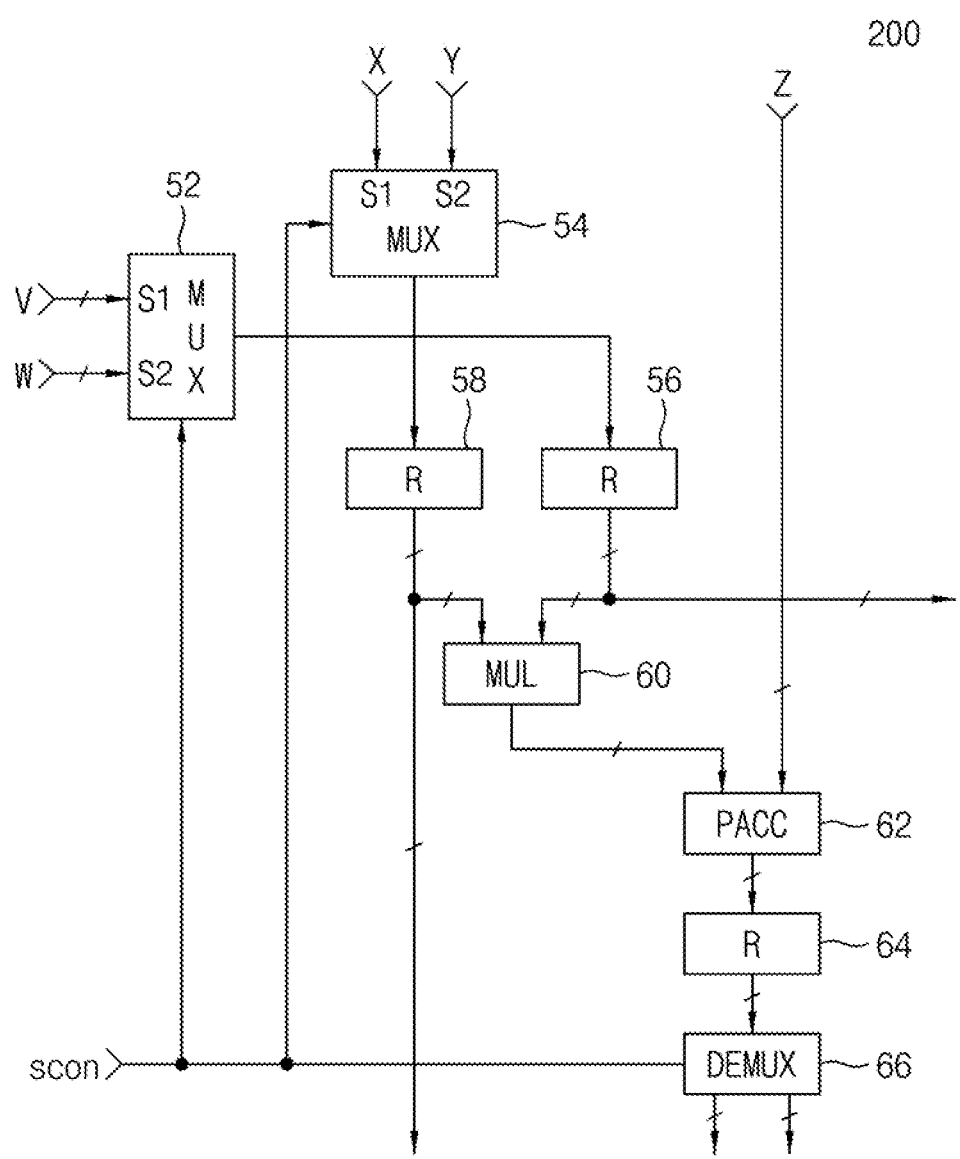
FIG. 2 is a block diagram showing the construction of a processing element according to an example embodiment of the disclosure.

FIG. 2 is a block diagram showing the construction of a processing element according to an example embodiment of the disclosure. The processing element 200 may include multiplexers 52 and 54, registers 56, 58, and 64, a multiplier 60, a partial accumulator 62, and a demultiplexer 66. Each of the multiplexers 52 and 54 and the demultiplexer 66 may be a selector.

The function of each of the blocks shown in FIG. 2 will be described with reference to FIGS. 1 and 2.

In response to the systolic array signal scon, the multiplexer 52 may select and output first input data V applied to a first terminal S1 during the first convolution operation, and may select and output second input data W applied to a second terminal S2 during the second convolution operation. According to an example embodiment, in the first convolution operation, the input data V may be the first input data A1, A2, A3, and A4 output from the input data generator 16 or the input data transmitted through the front-end processing elements disposed at the left side. According to an example embodiment, in the second convolution operation, the input data W may be the second input data C1 and C2, I1 and I2, F1 and F2, and L1 and L2 output from the input data generator 16 or the input data transmitted through the front-end processing elements disposed at the left side.

As an example, the first terminals S1 and the second terminals S2 of the multiplexers 52 of the other processing elements, excluding the multiplexers 52 of the processing elements PE13, PE23, PE34, and PE44 provided in a third column shown in FIG. 1, may be commonly connected to each other. As another example, each of the processing elements other than the processing elements PE13, PE23, PE34, and PE44 provided in the third column shown in FIG. 1 may include no multiplexer 52.

In response to the systolic array signal scon, the multiplexer 54 may select and output first weight data X applied to the first terminal during the first convolution operation, and may select and output second weight data Y applied to the second terminal S2 during the second convolution operation. According to an example embodiment, in the first convolution operation, the first weight data X may be the first weight data B1, B2, B3, and B4 output from the weight data generator 14 or the weight data transmitted through the front-end processing elements provided in the upstream direction. According to an example embodiment, the weight data Y may be the second weight data D1 and D2, J1 and J2, G1 and G2, and M1 and M2 output from the weight data generator 14 or the second weight data transmitted through the front-end processing elements provided in the upstream direction.

As an example, the first terminals S1 and the second terminals S2 of the multiplexers 54 of the other processing elements, excluding the multiplexers 54 of the processing elements PE31, PE32, PE33, and PE34 provided in a third row shown in FIG. 1, may be commonly connected to each other. As another example, each of the processing elements other than the processing elements PE13, PE23, PE34, and PE44 provided in the third column shown in FIG. 1 may include no multiplexer 54. As a further example, in the case in which the second weight data D1 and D2 and G1 and G2 are applied and then the second weight data J1 and J2 and M1 and M2 are applied, as described above, each of the processing elements PE11 to PE44 may include no multiplexer 54. Also, in the case in which the second weight data are stored in all of the processing elements PE11 to PE44, no weight data may be applied to the register 58.

The register 56 may store the input data output from the multiplexer 52. The stored input data may be transmitted to the rear-end processing elements disposed at the downside.

The register 58 may store the weight data output from the multiplexer 54. The stored weight data may be transmitted to the rear-end processing elements disposed at the downside.

The multiplier 60 may multiply the first input data output from the register 56 and the first weight data output from the register 58 to generate a first multiplication result during the first convolution operation, and may multiply the second input data output from the register 56 and the second weight data output from the register 58 to generate a second multiplication result during the second convolution operation.

The partial accumulator 62 may accumulate first multiplication results output from the multiplier 60 to generate a first partial accumulation result and may accumulate the first partial accumulation result and a second partial accumulation result Z transmitted from the front-end processing elements disposed at the upside to obtain a third partial accumulation result during the first convolution operation, and may accumulate second multiplication results output from the multiplier 60 to generate a fourth partial accumulation result and may accumulate the fourth partial accumulation result and a fifth partial accumulation result Z to obtain a sixth partial accumulation result during the second convolution operation.

The register 64 may store the third partial accumulation result or the sixth partial accumulation result output from the partial accumulator 62.

In response to the systolic array signal scon, the demultiplexer 66 may transmit the third partial accumulation result or the sixth partial accumulation result output from the register 64 to the rear-end processing elements disposed at the downside or to the accumulator 18.

Figure 3:
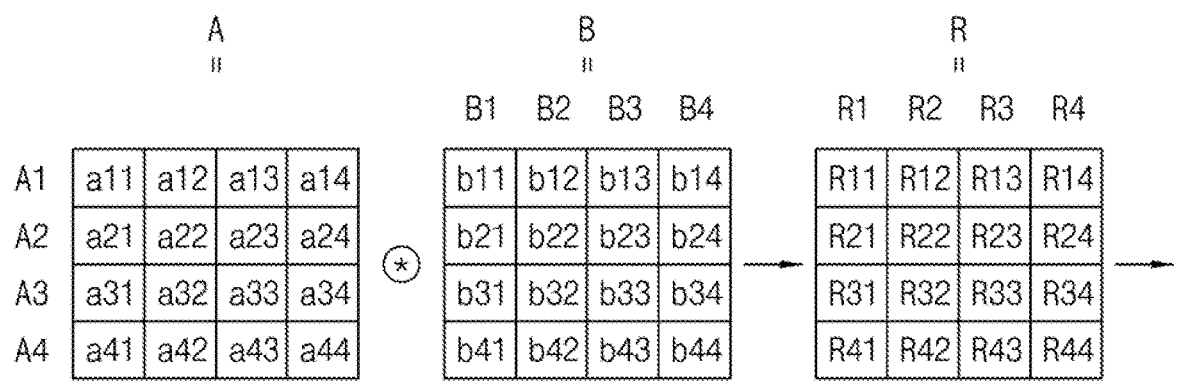
FIG. 3 is a view showing the first input matrix, the first weight matrix, first partial accumulation results of the processing elements, and the first output data of the systolic array according to the example embodiment of the disclosure.

FIG. 3 is a view showing the first input matrix, the first weight matrix, first partial accumulation results of the processing elements, and the first output data of the systolic array according to the example embodiment of the disclosure.

Referring to FIG. 3, the first input matrix A, which is a 4×4 matrix, may include first input data A1 (a11, a12, a13, and a14) of a first row vector, first input data A2 (a21, a22, a23, and a24) of a second row vector, first input data A3 (a31, a32, a33, and a34) of a third row vector, and first input data A4 (a41, a42, a43, and a44) of a fourth row vector.

The first weight matrix B, which is a 4×4 matrix, may include first weight data B1 (b11, b21, b31, and b41) of a first column vector, first weight data B2 (b12, b22, b32, and b42) of a second column vector, first weight data B3 (b13, b23, b33, and b43) of a third column vector, and first weight data B4 (b14, b24, b34, and b44) of a fourth column vector.

A partial accumulation matrix R indicates first partial accumulation results R11 to R44 of the processing elements PE11 to PE44. That is, a first partial accumulation result R11 (R11=a11×b11+a12×b21+a13×b31+a14×b41) may be obtained by the processing element PE11, and the first partial accumulation result R11 may be generated as a third partial accumulation result R11. A first partial accumulation result R21 (R21=a21×b11+a22×b21+a23×b31+a24×b41) may be obtained by the processing element PE21, and the first partial accumulation result R11 and the third partial accumulation result R11 may be summed to generate a third partial accumulation result R11+R21. A first partial accumulation result R41 (R41=a41×b11+a42×b21+a43×b31+a44×b41) may be obtained by the processing element PE41, and the first partial accumulation result R41 and the second partial accumulation result R11+R21+R31 may be summed to generate a third partial accumulation result R11+R21+R31+R41 as output data O1. The other partial accumulation results may be obtained and output data O2, O3, and O4 may be generated using the same method.

The accumulator 18 may add the output data O1, O2, O3, and O4 to generate first convolution result data O.

Figure 4:
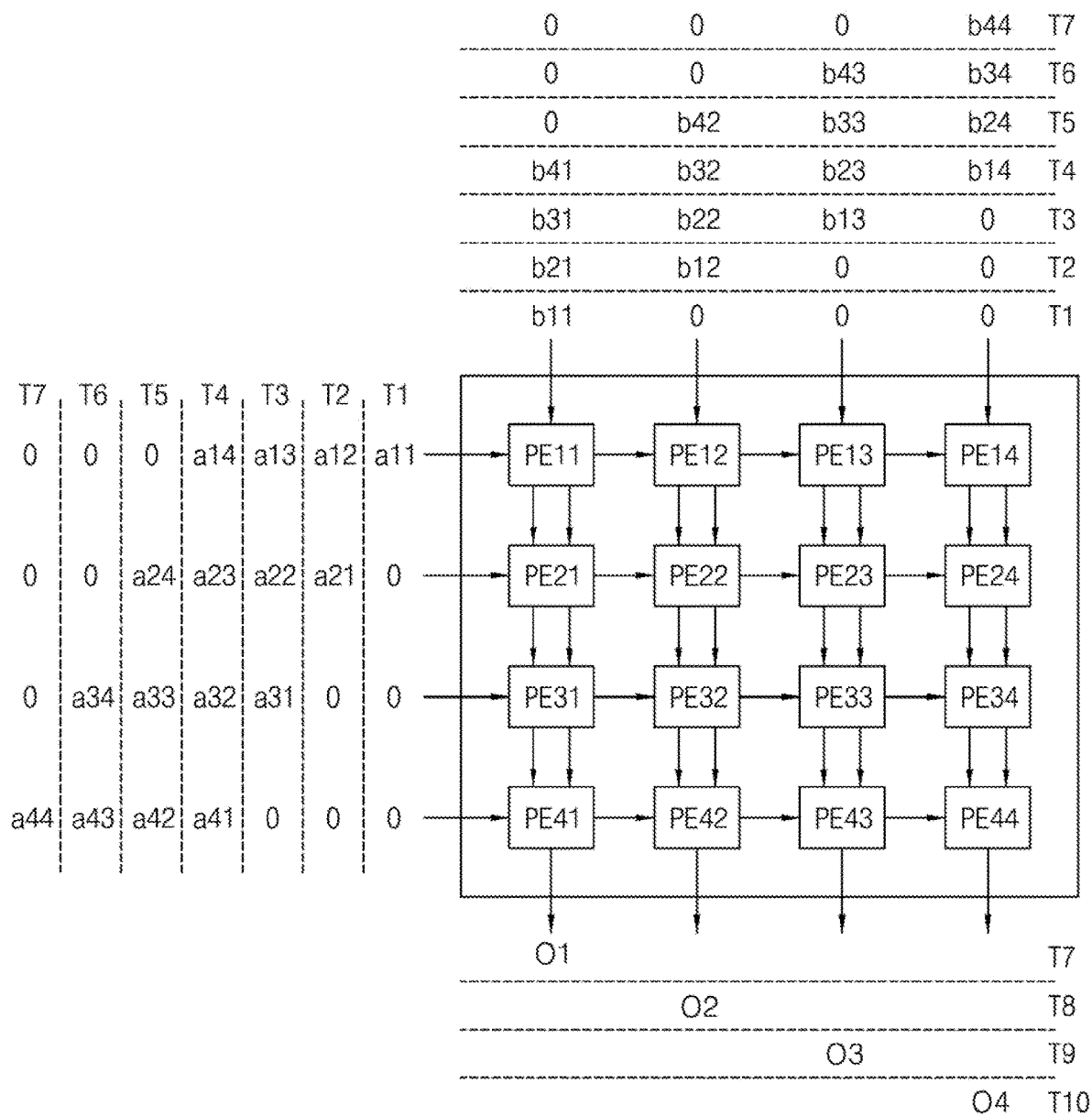
FIG. 4 is a view showing an input sequence of the first input data and the first weight data and an output sequence of the first output data of the systolic array according to the example embodiment of the disclosure.

FIG. 4 is a view showing an input sequence of the first input data and the first weight data and an output sequence of the first output data of the systolic array according to the example embodiment of the disclosure.

Referring to FIGS. 3 and 4, the first input data A1 (a11 to a14) of the first row vector and the first weight data B1 (b11 to b41) of the first column vector start to be applied at a first cycle T1, the first input data A2 (a21 to a24) of the second row vector and the first weight data B2 (b12 to b42) of the second column vector start to be applied at a second cycle T2, the first input data A3 (a31 to a34) of the third row vector and the first weight data B3 (b13 to b43) of the third column vector start to be applied at a third cycle T3, and the first input data A4 (a41 to a44) of the fourth row vector and the first weight data B4 (b14 to b44) of the fourth column vector start to be applied at a fourth cycle T4. From the first cycle T1 to a seventh cycle T7, the first input data A1 (a11 to a14), A2 (a21 to a24), A3 (a31 to a34), and A4 (a41 to a44) may be sequentially applied in a state of being delayed by one cycle, and the first weight data B1 (b11 to b41), B2 (b12 to b42), B3 (b13 to b43), and B4 (b14 to b44) may be sequentially applied in a state of being delayed by one cycle. From the seventh cycle T7 to a tenth cycle T10, the first output data O1, O2, O3, and O4 may be sequentially generated in a state of being delayed by one cycle.

FIGS. 5A to 5D are views illustrating the first convolution operation on the systolic array according to the example embodiment of the disclosure. The operation at the third cycle T3, the fourth cycle T4, the fifth cycle T5, the sixth cycle T6, the eighth cycle T8, and the ninth cycle T9 is omitted.

Figure 5A:
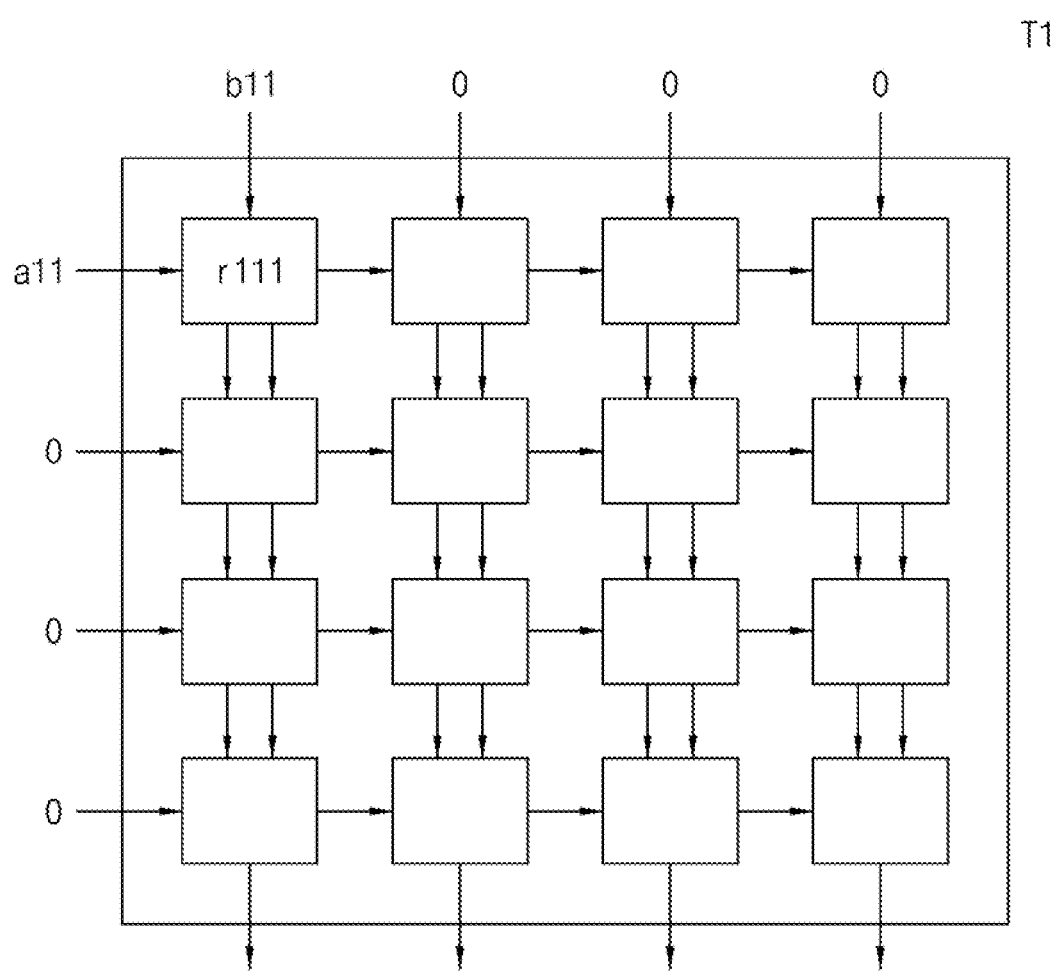
FIGS. 5A to 5D are views illustrating the first convolution operation on the systolic array according to the example embodiment of the disclosure.

Referring to FIG. 5A, at the first cycle T1, the processing element PE11 may multiply the first input data a11 and the first weight data b11 (a11×b11) to obtain a first multiplication result r111.

Figure 5B:
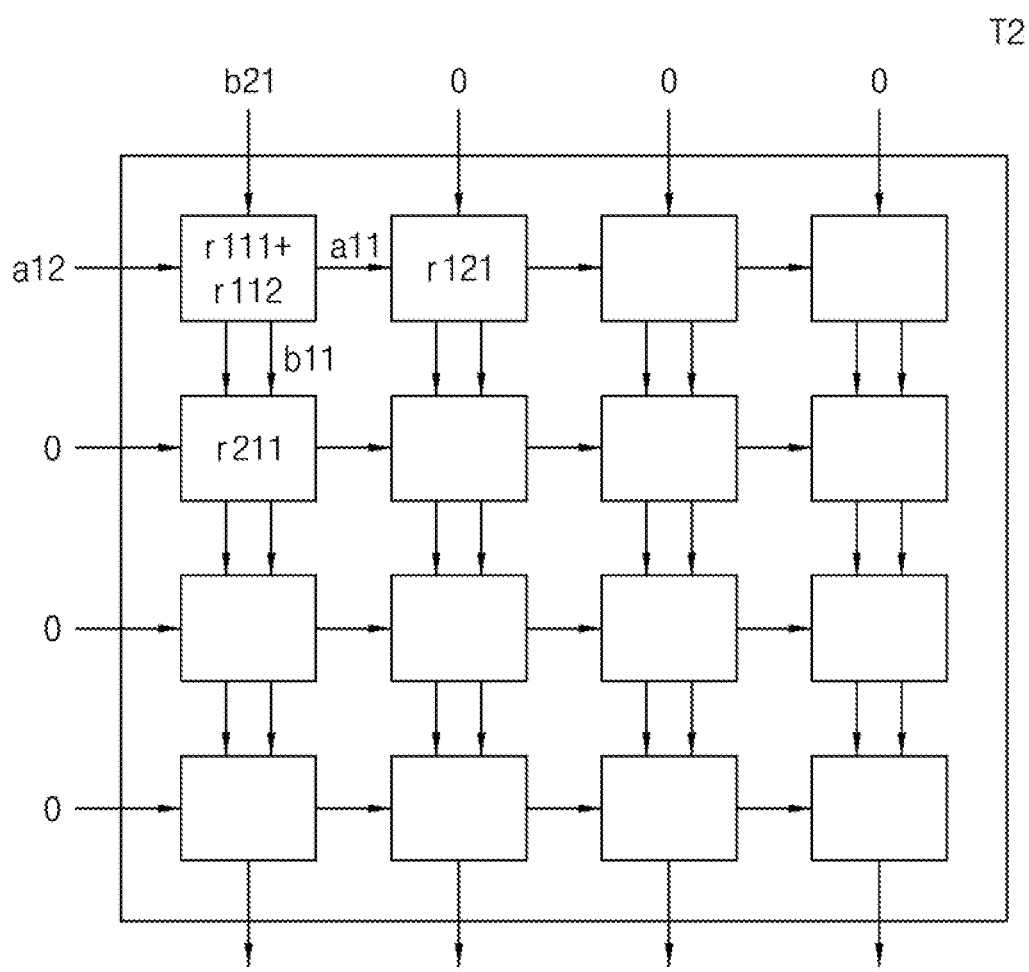

Referring to FIG. 5B, at the second cycle T2, the processing element PE11 may multiply the first input data a12 by the first weight data b21 (a12×b21) to obtain a first multiplication result r112, and may add the first multiplication result r111 to the first multiplication result r112. The processing element PE12 may multiply the first input data a11 and the first weight data b12 (a11×b12) to obtain a first multiplication result r121. The processing element PE21 may multiply the first input data a21 and the first weight data b11 (a21×b11) to obtain a first multiplication result r211.

Figure 5C:
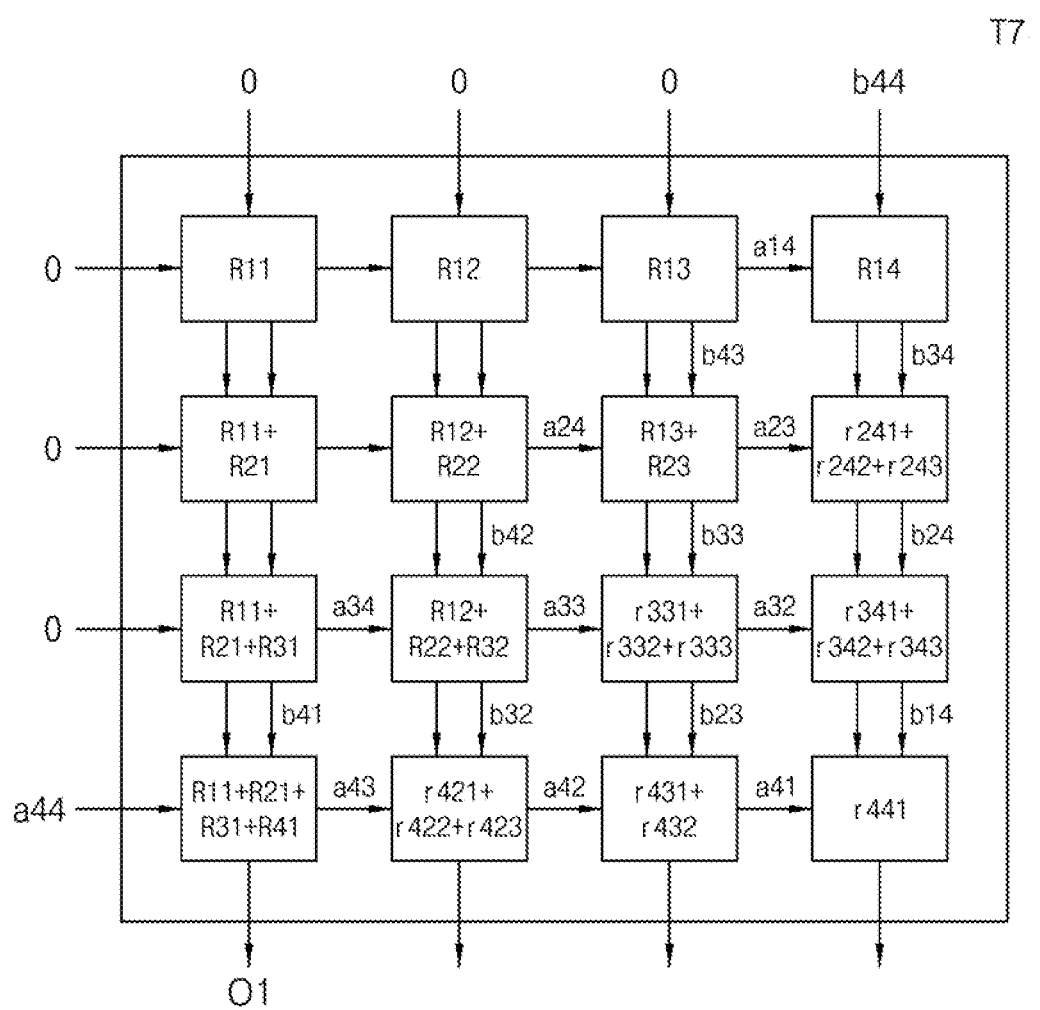

Referring to FIG. 5C, at the seventh cycle T7, the processing element PE41 may multiply the first input data a44 by the first weight data b41 (a44×b41) to obtain a first multiplication result r414, may add the first multiplication result r414 to a first multiplication result obtained at the sixth cycle T6 to obtain a first partial accumulation result R41, and may add the first partial accumulation result R41 to a second partial accumulation result R11+R21+R31 transmitted from the processing element PE31 to generate a third partial accumulation result R11+R21+R31+R41 as output data O1. The other processing elements may also obtain results shown in FIG. 5C through the operation thereof.

Figure 5D:
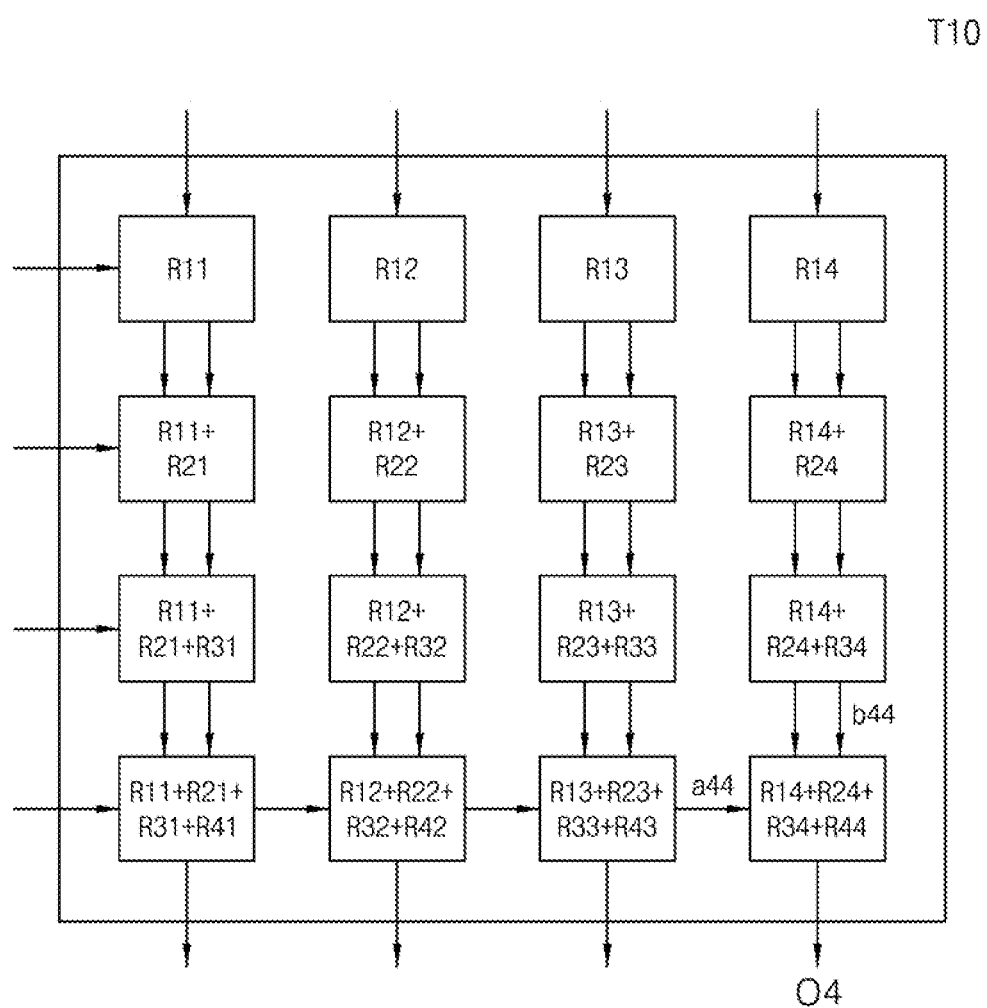

Referring to FIG. 5D, at the tenth cycle T10, the processing element PE44 may multiply the first input data a44 by the first weight data b44 (a44×b44) to obtain a first multiplication result r444, may add the first multiplication result r444 to a first multiplication result obtained at the ninth cycle T9 to obtain a first partial accumulation result R44, and may add the first partial accumulation result R44 to a second partial accumulation result R14+R24+R34 transmitted from the processing element PE34 to generate a third partial accumulation result R14+R24+R34+R44 as output data O4.

FIGS. 6A to 6D are views showing the second input matrices, the second weight matrices, fourth partial accumulation results of the processing elements, and the second output data of the partial systolic arrays according to the example embodiment of the disclosure.

Figure 6A:
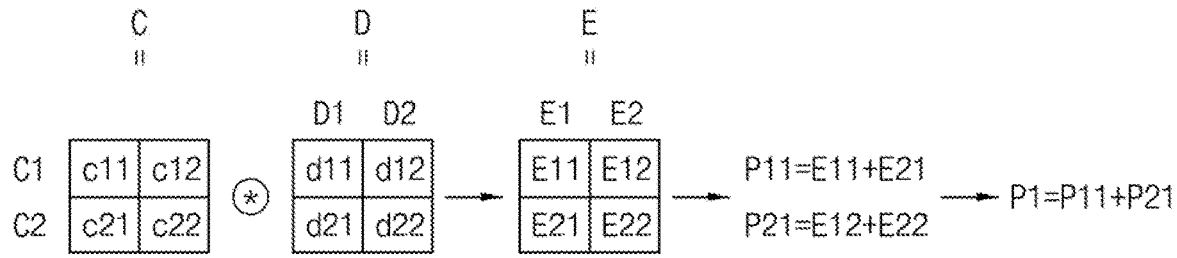
FIGS. 6A to 6D are views showing the second input matrices, the second weight matrices, fourth partial accumulation results of the processing elements, and the second output data of the partial systolic arrays according to the example embodiment of the disclosure.

Referring to FIGS. 1 and 6A, the second input matrix C of the partial systolic array 10-2, which is a 2×2 matrix, may include second input data C1 (c11 and c12) of a first row vector and second input data C2 (c21 and c22) of a second row vector. The second weight matrix D of the partial systolic array 10-2, which is a 2×2 matrix, may include second weight data D1 (d11 and d21) of a first column vector and second weight data D2 (d12 and d22) of a second column vector. A matrix E indicates fourth partial accumulation results E11 to E22 obtained by the processing elements PE11, PE12, PE21, and PE22. A fourth partial accumulation result E11 (E11=c11×d11+c12×d21) may be obtained by the processing element PE11, and the fourth partial accumulation result E11 may be generated as a sixth partial accumulation result. A fourth partial accumulation result E21 (E21=c21×d11+c22×d21) may be obtained by the processing element PE21, and the fourth partial accumulation result E21 and a fifth partial accumulation result E11 may be summed to generate a sixth partial accumulation result E11+E21 as second output data P11. A fourth partial accumulation result E12 (E12=c11×d12+c12×d22) may be obtained by the processing element PE12, and the fourth partial accumulation result E12 may be generated as a sixth partial accumulation result. A fourth partial accumulation result E22 (E22=c21×d12+c22×d22) may be obtained by the processing element PE22, and the fourth partial accumulation result E22 and a fifth partial accumulation result E12 output from the processing element PE12 may be summed to generate a sixth partial accumulation result E12+E22 as second output data P21.

Figure 6B:
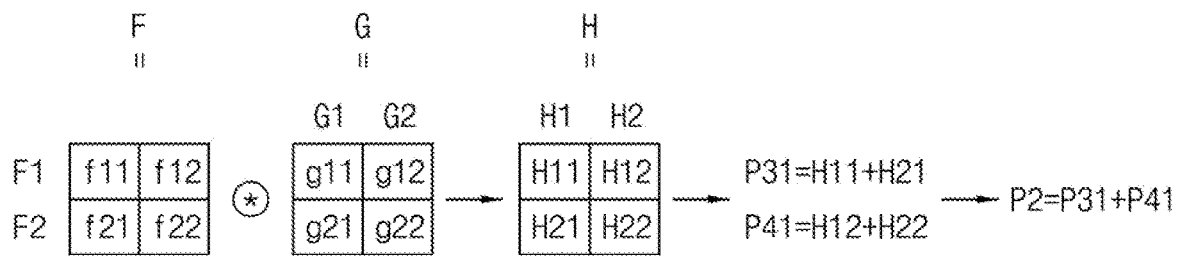

Referring to FIGS. 1 and 6B, the second input matrix F of the partial systolic array 10-4, which is a 2×2 matrix, may include second input data F1 (f11 and f12) of a first row vector and second input data F2 (f21 and f22) of a second row vector. The second weight matrix G of the partial systolic array 10-4, which is a 2×2 matrix, may include second weight data G1 (g11 and g21) of a first column vector and second weight data G2 (g12 and g22) of a second column vector. A matrix H indicates fourth partial accumulation results H11 to H22 obtained by the processing elements PE13, PE14, PE23, and PE24. A fourth partial accumulation result H11 (H11=f11×g11+g12×g21) may be obtained by the processing element PE13, and the fourth partial accumulation result H11 may be generated as a sixth partial accumulation result. A fourth partial accumulation result H21 (H21=f21×g11+f22×g21) may be obtained by the processing element PE23, and the fourth partial accumulation result H21 and a fifth partial accumulation result H11 output from the processing element PE13 may be summed to generate a sixth partial accumulation result H11+H21 as second output data P31. A fourth partial accumulation result H12 (H12=f11×g12+f12×g22) may be obtained by the processing element PE14, and the fourth partial accumulation result H12 may be generated as a sixth partial accumulation result. A fourth partial accumulation result H22 (H22=f21×g12+f22×g22) may be obtained by the processing element PE24, and the fourth partial accumulation result H22 and a fifth partial accumulation result H12 output from the processing element PE14 may be summed to generate a sixth partial accumulation result H12+H22 as second output data P41.

Figure 6C:
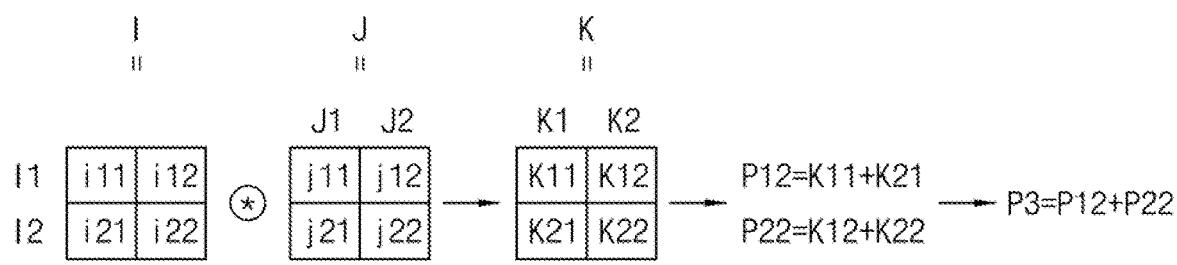

Referring to FIGS. 1 and 6C, the second input matrix I of the partial systolic array 10-6, which is a 2×2 matrix, may include second input data I1 (i11 and i12) of a first row vector and second input data I2 (i21 and i22) of a second row vector. The second weight matrix J of the partial systolic array 10-6, which is a 2×2 matrix, may include second weight data J1 (j11 and j21) of a first column vector and second weight data J2 (j12 and j22) of a second column vector. A matrix K indicates fourth partial accumulation results K11 to H22 obtained by the processing elements PE31, PE32, PE41, and PE42. A fourth partial accumulation result K11 (K11=i11×j11+i12×j21) may be obtained by the processing element PE31, and the fourth partial accumulation result K11 may be generated as a sixth partial accumulation result. A fourth partial accumulation result K21 (K21=i21×j11+i22×j21) may be obtained by the processing element PE32, and the fourth partial accumulation result K21 and a fifth partial accumulation result K11 output from the processing element PE31 may be summed to generate a sixth partial accumulation result K11+K21 as second output data P12. A fourth partial accumulation result K12 (K12=i11×j12+i12×j22) may be obtained by the processing element PE32, and the fourth partial accumulation result K12 may be generated as a sixth partial accumulation result. A fourth partial accumulation result K22 (K22=i21×j12+i22×j22) may be obtained by the processing element PE42, and the fourth partial accumulation result K22 and a fifth partial accumulation result K12 output from the processing element PE32 may be summed to generate a sixth partial accumulation result K12+K22 as output data P22.

Figure 6D:
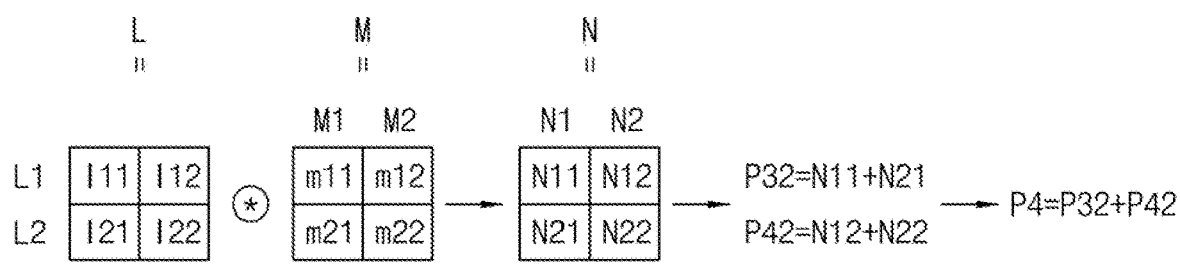

Referring to FIGS. 1 and 6D, the input matrix L of the partial systolic array 10-8, which is a 2×2 matrix, may include second input data L1 (l11 and l12) of a first row vector and second input data L2 (l21 and l22) of a second row vector. The second weight matrix M of the partial systolic array 10-8, which is a 2×2 matrix, may include second weight data M1 (m11 and m21) of a first column vector and second weight data M2 (m12 and m22) of a second column vector. A matrix L indicates fourth partial accumulation results M11 to M22 obtained by the processing elements PE33, PE34, PE43, and PE44. A fourth partial accumulation result M11 (M11=l11×m11+l12×m21) may be obtained by the processing element PE33, and the fourth partial accumulation result M11 may be generated as a sixth partial accumulation result. A fourth partial accumulation result M21 (M21=l21×m11+l22×m21) may be obtained by the processing element PE34, and the fourth partial accumulation result M21 and a fifth partial accumulation result M11 output from the processing element PE33 may be summed to generate a sixth partial accumulation result M11+M21 as second output data P22. A fourth partial accumulation result M12 (M12=l11×m12+l12×m22) may be obtained by the processing element PE34, and the fourth partial accumulation result M12 may be generated as a sixth partial accumulation result. A fourth partial accumulation result M22 (M22=l21×m12+l22×m22) may be obtained by the processing element PE44, and the fourth partial accumulation result M22 and a fifth partial accumulation result M12 output from the processing element PE34 may be summed to generate a sixth partial accumulation result M12+M22 as output data P42.

Figure 7:
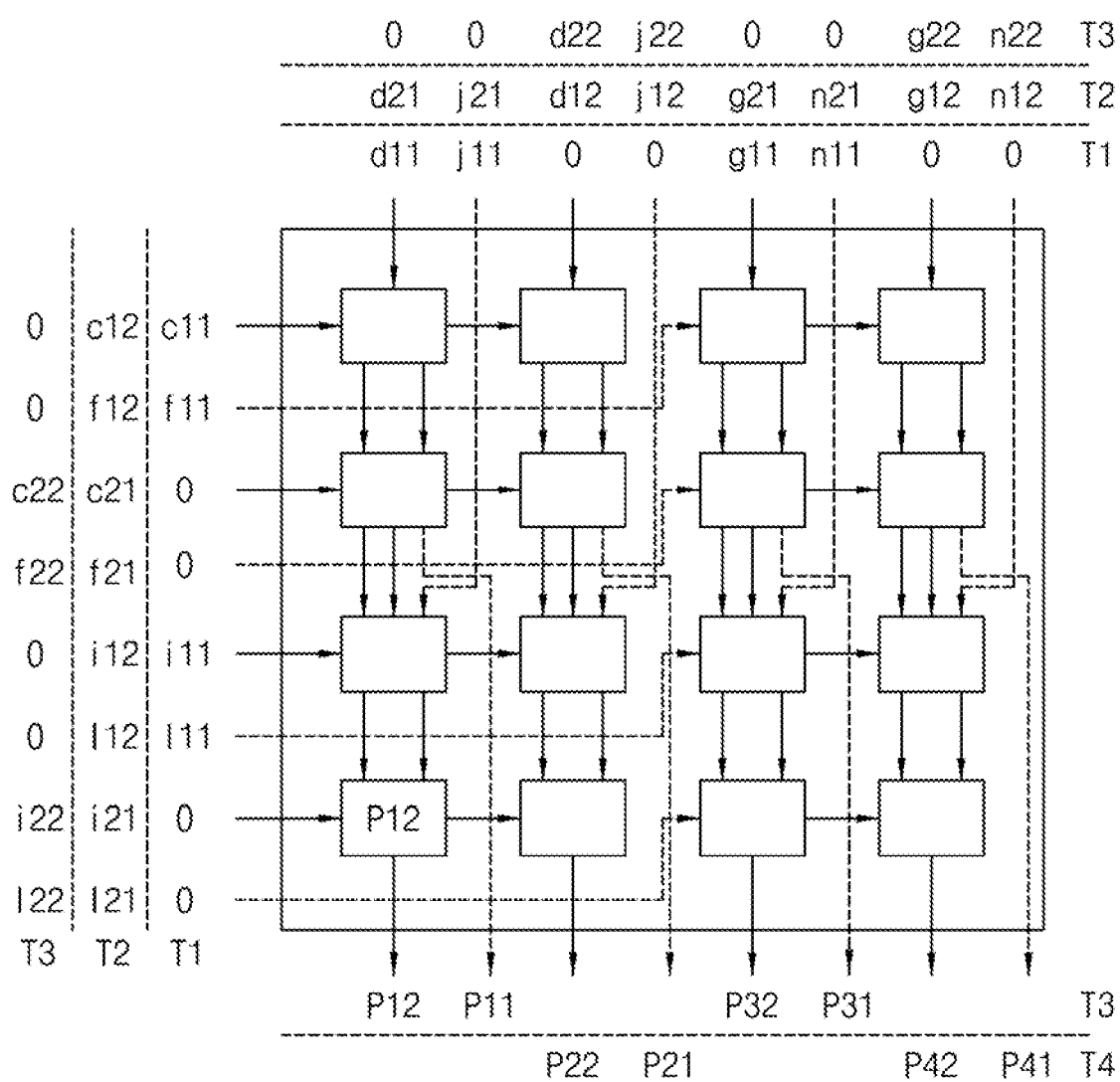
FIG. 7 is a view showing an input sequence of the second input data and the second weight data and an output sequence of the second output data of the partial systolic arrays according to the example embodiment of the disclosure.

FIG. 7 is a view showing an input sequence of the second input data and the second weight data and an output sequence of the second output data of the partial systolic arrays according to the example embodiment of the disclosure.

Referring to FIGS. 6A to 7, the second input data C1, F1, I1, and L1 of first row vectors of the second input matrices C, F, I, and L and the second weight data D1, J1, G1, and M1 of first column vectors of the second weight matrices D, G, J, and M start to be applied at a first cycle T1, and the second input data C2, F2, I2, and L2 of second row vectors of the second input matrices C, F, I, and L and the second weight data D2, J2, G2, and M2 of second column vectors of the second weight matrices D, G, J, and M start to be applied at a second cycle T2. From the first cycle T1 to a third cycle T3, the second input data C1 (c11 and c12), F1 (f11 and f12), I1 (i11 and i12), L1 (l11 and l12), C2 (c21 and c22), F2 (f21 and f22), I2 (i21 and i22), and L2 (l21 and l22) may be sequentially applied in a state of being delayed by one cycle, and the second weight data D1 (d11 and d21), J1 (j11 and j21), G1 (g11 and g21), M1 (m11 and m21), D2 (d12 and d22), J2 (j12 and j22), and G2 (g12 and g22) may be sequentially applied in a state of being delayed by one cycle. At the third cycle T3, the second output data P12, P11, P32, and P31 may be simultaneously generated. At a fourth cycle T4, the second output data P22, P21, P42, and P41 may be simultaneously generated, and the second output data P12, P11, P32, and P31 and the second output data P22, P21, P42, and P41 may be sequentially generated in a state of being delayed by one cycle.

FIGS. 8A to 8D are views illustrating the second convolution operation on the partial systolic arrays according to the example embodiment of the disclosure.

Figure 8A:
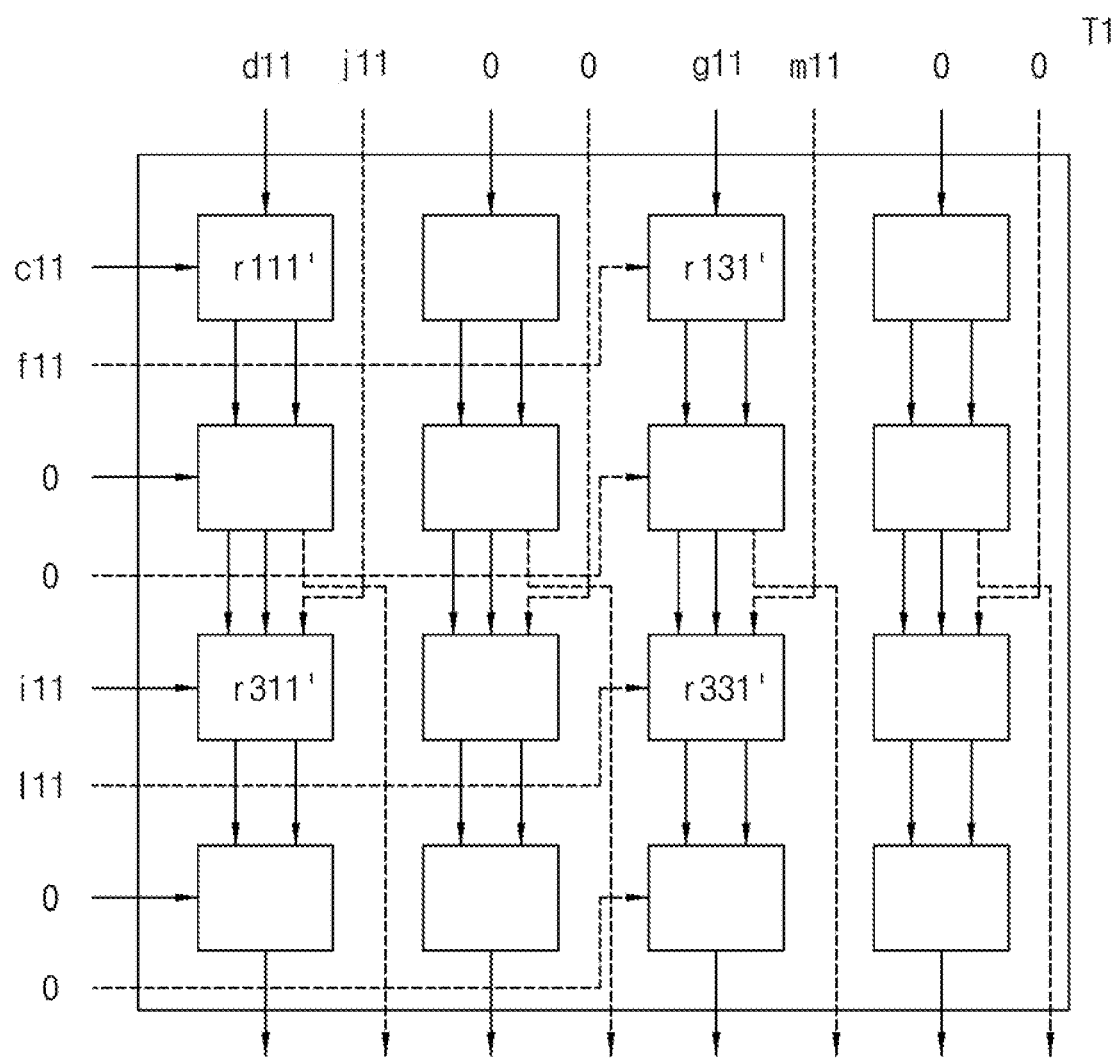
FIGS. 8A to 8D are views illustrating the second convolution operation on the partial systolic arrays according to the example embodiment of the disclosure.

Referring to FIG. 8A, at the first cycle T1, the processing element PE11 may multiply the second input data c11 by the second weight data d11 (c11×d11) to obtain a second multiplication result r111'. The processing element PE13 may multiply the second input data g11 by the second weight data f11 (g11×f11) to obtain a second multiplication result r131'. The processing element PE31 may multiply the second input data i11 by the second weight data j11 (i11×j11) to obtain a second multiplication result r311'. The processing element PE33 may multiply the second input data l11 and the second weight data m11 (l11×m11) to obtain a second multiplication result r331'.

Figure 8B:
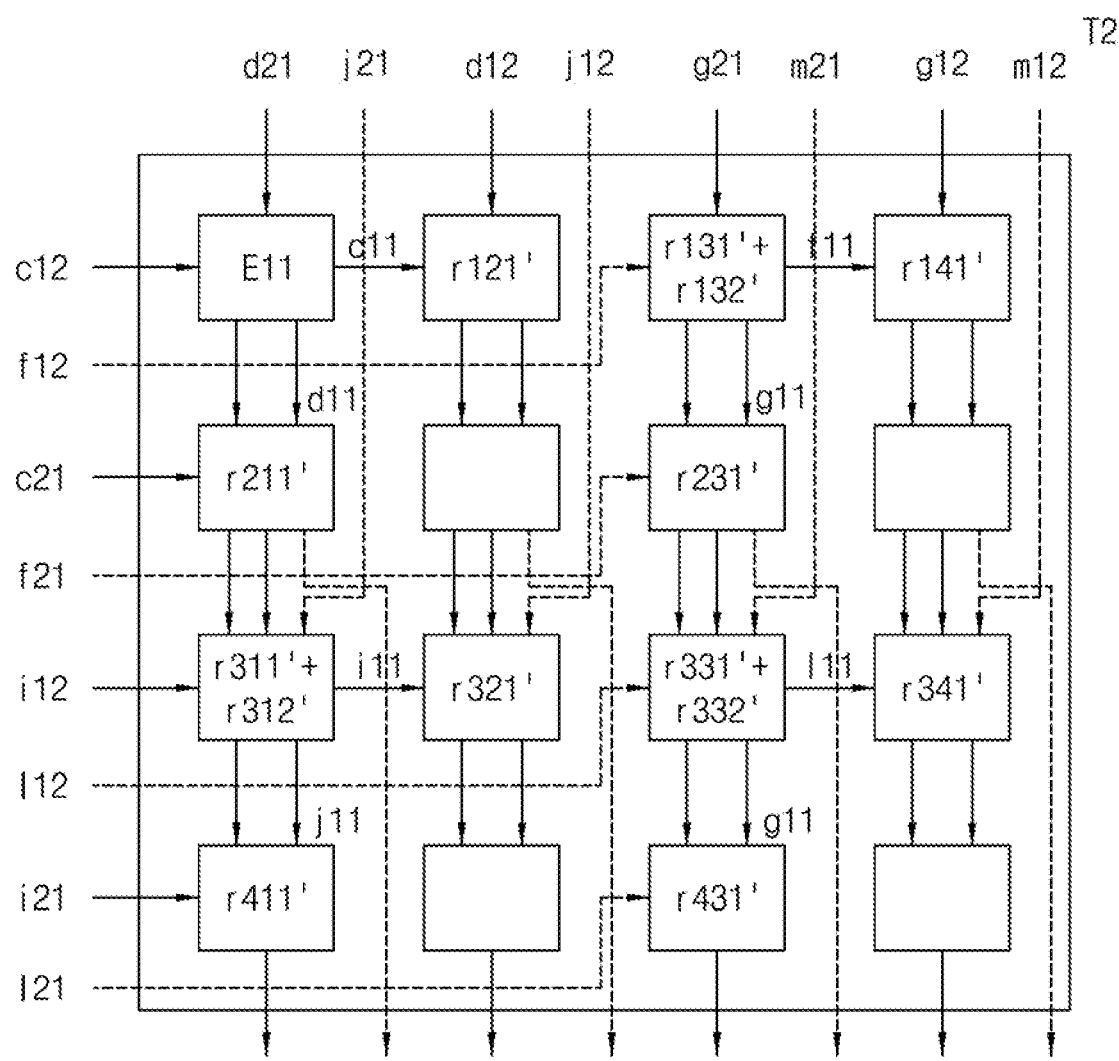

Referring to FIG. 8B, at the second cycle T2, the processing element PE11 may multiply the second input data c12 by the second weight data d21 (c12×d21) to obtain a second multiplication result r112', and may add the second multiplication result r111' by the second multiplication result r112' to obtain a fourth partial accumulation result E11. The processing element PE12 may multiply the second input data c11 by the second weight data d12 (c11×d12) to obtain a second multiplication result r121'. The processing element PE21 may multiply the second input data c21 by the second weight data d11 (c21×d11) to obtain a second multiplication result r211'. The processing elements of the partial systolic arrays 10-4 to 10-8 may also obtain results shown in FIG. 8B through the operation thereof.

Figure 8C:
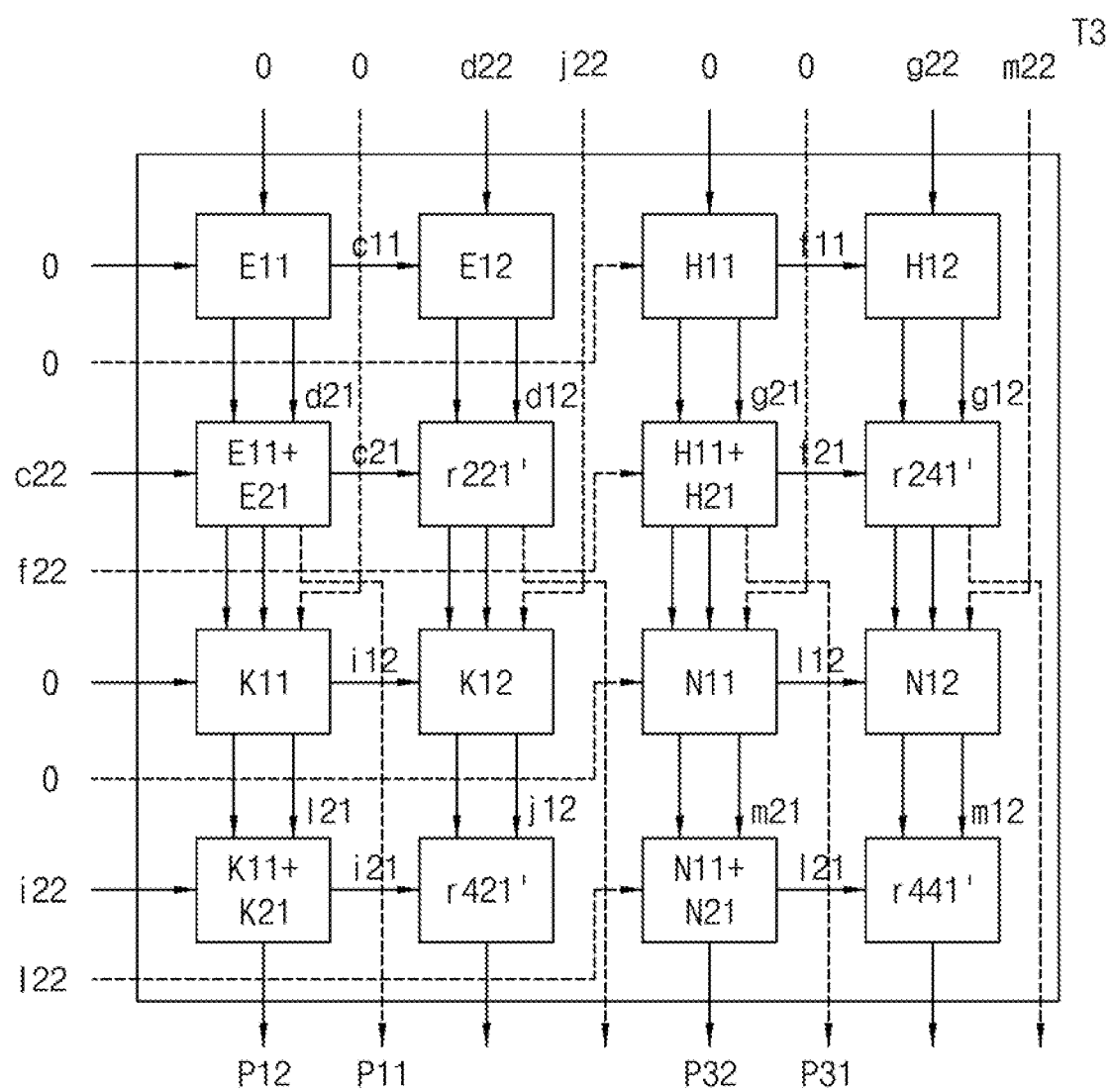

Referring to FIG. 8C, at the third cycle T3, the processing element PE12 may multiply the second input data c12 by the second weight data d22 (c12×d22) to obtain a fourth multiplication result r122', and may add a fourth multiplication result r121' to the fourth multiplication result r122' to obtain a fourth partial accumulation result E12. The processing element PE21 may multiply the second input data c22 by the second weight data d21 (c22×d21) to obtain a second multiplication result r212', may add the second multiplication result r211' to second multiplication result r212' to obtain a fourth partial accumulation result E21, and may add the fourth partial accumulation result E11 to a fifth partial accumulation result E21 to generate a sixth partial accumulation result E11+E21 as output data P11. The processing element PE22 may multiply the second input data c21 by the second weight data d12 (c21×d12) to obtain a fourth multiplication result r221'. The processing elements of the partial systolic arrays 10-4 to 10-8 may also obtain results shown in FIG. 8C through the operation thereof.

Figure 8D:
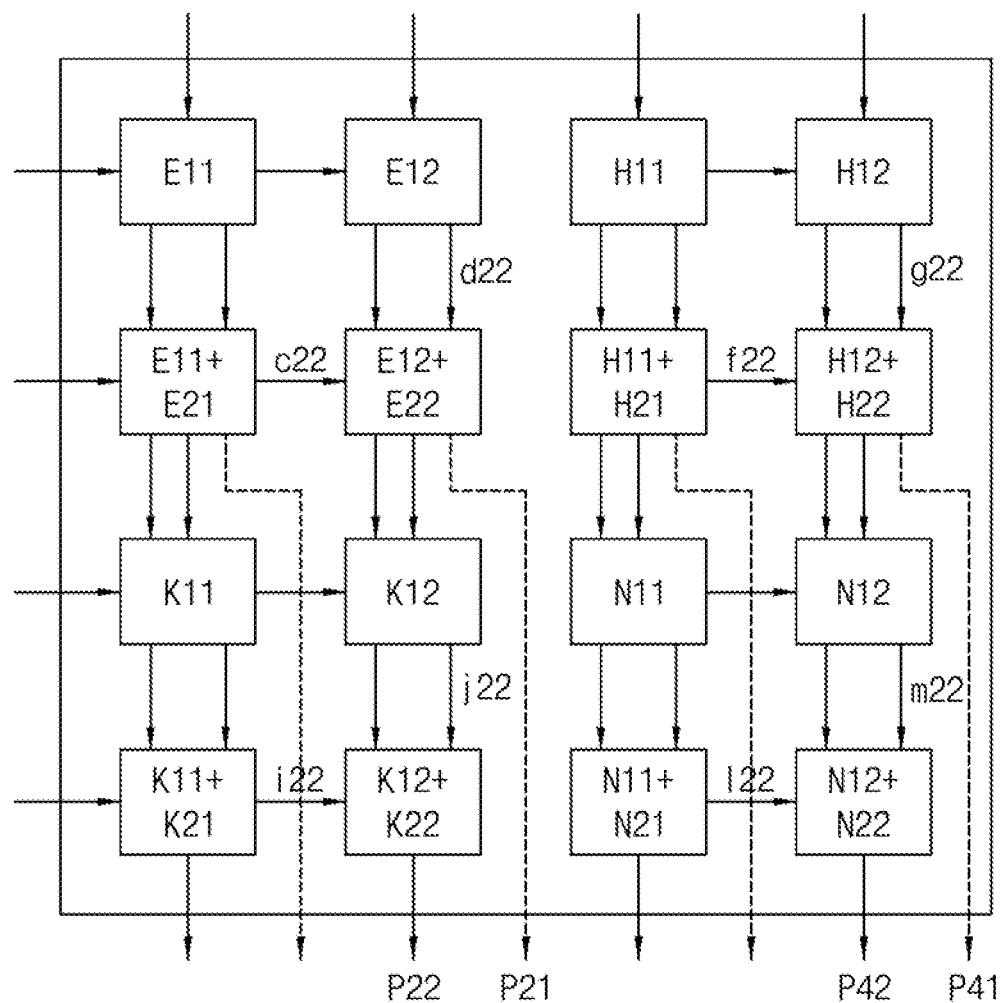

Referring to FIG. 8D, at the fourth cycle T4, the processing element PE22 may multiply the second input data c22 by the second weight data d22 (c22×d22) to obtain a second multiplication result r222', may add a second multiplication result r221' to the second multiplication result r222' to obtain a fourth partial accumulation result E22, and may add the fourth partial accumulation result E22 to a fifth partial accumulation result E12 to generate a sixth partial accumulation result as output data P21. The processing elements of the partial systolic arrays 10-4 to 10-8 may also obtain results shown in FIG. 8D through the operation thereof.

According to an example embodiment, the first input matrix A shown in FIG. 3 may be divided into four parts, which are the second input matrices C, F, I, and L of FIGS. 6A to 6D, the first weight matrix B may be divided into four parts, which are the second weight matrices D, G, J, and M of FIGS. 6A to 6D, the four partial systolic arrays 10-2, 10-4, 10-6, and 10-8 perform the second convolution operation to generate second output data P11 and P21, P31 and P41, P12 and P22, and P32 and P42, respectively, and the eight second output data P11, P21, P31, P41, P12, P22, P32, and P42 may be summed by the accumulator 18 to generate output data. In this case, the generated output data may be identical to first convolution result data O of the first input matrix A and the first weight matrix B. That is, the same convolution result data may be generated while a convolution operation time is reduced.

In the above example embodiments, the first input data and the second input data may be image data, and the first weight data and the second weight data may be filter data. Also, in the above example embodiments, the accelerator may be included in a semiconductor memory device.

In the example embodiments of the disclosure, during the convolution operation, the size of the matrix of the systolic array may be variably reconfigured depending on the size of the weight matrix, whereby it is possible to simultaneously perform the convolution operation. That is, in the case in which the size of the weight matrix is less than the size of the matrix of the systolic array, partial systolic arrays may perform the convolution operation in parallel, whereby it is possible to reduce the operation time. Consequently, it is possible to improve performance of an accelerator including the same.

While the example embodiments of the inventive concept have been described with reference to the accompanying drawings, it will be understood by those skilled in the art that various modifications may be made without departing from the scope of the inventive concept and without changing essential features thereof. Therefore, the above-described embodiments should be considered in a descriptive sense only and not for the purposes of limitation.

What is claimed is:

1. A systolic array comprising:
    a plurality of processing elements provided in an n×n matrix, the plurality of processing elements configured to perform:
        a first convolution operation on first input data of row vectors of a first input n×n matrix and first weight data of column vectors of a first weight n×n matrix to generate n first output data, or
        divide operation of the plurality of processing elements into k partial systolic arrays, each of the k partial systolic arrays comprising a plurality of sub-processing elements provided in an m×m matrix, and
        perform a second convolution operation on second input data of row vectors of k second input m×m matrices, each corresponding one of the k partial systolic arrays and second weight data of column vectors of k second weight m×m matrices, each corresponding one the k partial systolic arrays, to generate m second output data,
    wherein n is an integer greater than or equal to 4,
    wherein k is an integer greater than or equal to 4,
    wherein m is an integer less than n, and m is greater than or equal to 2,
    wherein each of the plurality of processing elements comprises:
        a first multiplexer configured to select and output, as a selected output data, one of the first input data of row vectors during the first convolution operation, and one of the second input data of row vectors during the second convolution operation,
        a second multiplexer configured to select and output, as a selected output weight, one of the first weight data of column vectors during the first convolution operation, and one of the second weight data of column vectors during the second convolution operation,
        a first register configured to store the selected output data from the first multiplexer,
        a second register configured to store the selected output weight from the second multiplexer,
        a multiplier configured to multiply the selected output data from the first register and the selected output weight from the second register,
        a partial accumulator configured accumulate multiplication results output from the multiplier to generate a partial accumulation result, and
        a demultiplexer configured to transmit an output from the partial accumulator to a rear-end processing elements disposed at the downside or to an accumulator.

2. The systolic array according to claim 1, wherein, during the first convolution operation,
    each of a plurality of first column processing elements provided in a first column of the n×n matrix, among the plurality of processing elements, receives a corresponding one of first input data of n row vectors of the first input n×n matrix,
    each of a plurality of first row processing elements provided in a first row of the n×n matrix, among the plurality of processing elements, receives a corresponding one of first weight data of n column vectors of the first weight n×n matrix,
    a first remaining processing elements other than the plurality of first column processing elements provided in the first column of the n×n matrix, among the plurality of processing elements, receive first input data applied through a front-end processing element provided preceding the respective processing element in a first direction,
    a second remaining processing elements other than the plurality of first row processing elements provided in the first row of the n×n matrix, among the plurality of processing elements, receive first weight data applied through a front-end processing element provided preceding the respective processing element in a second direction, and
    each of the plurality of processing elements multiplies the received first input data and the received first weight data to obtain first multiplication results, accumulates the first multiplication results to obtain a first partial accumulation result, adds the first partial accumulation result to a second partial accumulation result transmitted from the front-end processing element preceding the respective processing element in the second direction to obtain a third partial accumulation result, and transmits the third partial accumulation result to a rear-end processing element succeeding the respective processing element in a third direction.

3. The systolic array according to claim 2, wherein
    the n row vectors of the first input n×n matrix comprise n first input data, the n first input data of the n row vectors being sequentially applied in a state of being delayed by one cycle, and
    the n column vectors of the first weight n×n matrix comprise n first weight data, the n first weight data of the n column vectors being sequentially applied in a state of being delayed by one cycle.

4. The systolic array according to claim 2, wherein, during the second convolution operation,
    a plurality of first column sub-processing elements provided in a first column of the m×m matrix, among the plurality of sub-processing elements of each of the k partial systolic arrays that do not comprise the plurality of first column processing elements provided in the first column of the n×n matrix, do not receive second input data transmitted through front-end processing elements provided preceding respective sub-processing element in the first direction, and receive second input data of row vectors of a corresponding one of the k second input m×m matrices,
    a plurality of first row sub-processing elements provided in a first row of the m×m matrix, among the plurality of sub-processing elements of each of the k partial systolic arrays that do not comprise the plurality of first row processing elements provided in the first row of the n×n matrix, do not receive second weight data transmitted through front-end processing elements provided preceding the respective sub-processing element in the second direction, and receive second weight data of column vectors of a corresponding one of the k second input m×m matrices,
    a plurality of first remaining sub-processing elements other than the plurality of first column sub-processing elements provided in the first column of the m×m matrix, among the plurality of sub-processing elements of each of the k partial systolic arrays, receive second input data applied through a front-end processing element provided preceding the respective sub-processing element in the first direction, a plurality of second remaining sub-processing elements other than the plurality of first row sub-processing elements provided in a first row matrix, among the plurality of sub-processing elements of each of the k partial systolic arrays, receive second weight data applied through a front-end processing element provided preceding the respective sub-processing element in the second direction, and each of the plurality of sub-processing elements of each of the k partial systolic arrays multiplies the received second input data and the received second weight data to obtain second multiplication results, accumulates the second multiplication results to obtain a fourth partial accumulation result, adds the fourth partial accumulation result to a fifth partial accumulation result transmitted from a respective front-end processing element preceding the respective sub-processing element in the second direction to obtain a sixth partial accumulation result, and transmits the sixth partial accumulation result to a rear-end processing element succeeding the respective sub-processing element in the third direction or to an outside.

5. The systolic array according to claim 4, wherein the m row vectors of each of the second input matrices comprise m second input data, the m second input data of the m row vectors of each of the second input matrices being sequentially applied in a state of being delayed by one cycle, and the m column vectors of each of the second weight m×m matrices comprise m second weight data, the m second weight data of the m column vectors of each of the second weight m×m matrices being sequentially applied in a state of being delayed by one cycle.

6. The systolic array according to claim 2, wherein, during the second convolution operation, second weight data of a second weight matrix, among the k second weight m×m matrices, are stored in advance in the plurality of sub-processing elements of each of the k partial systolic arrays, a plurality of first column sub-processing elements provided in a first column of the m×m matrix, among the plurality of sub-processing elements of each of the partial systolic arrays comprising the plurality of first column processing elements provided in the first column of the n×n matrix, receive second input data of row vectors of a corresponding one of the k second input m×m matrices, a plurality of first column sub-processing elements provided in a first column of the m×m matrix, among the plurality of sub-processing elements of each of the k partial systolic arrays that do not comprise the plurality of first column processing elements provided in the first column of the n×n matrix, do not receive second input data transmitted through front-end processing elements provided preceding the respective first remaining sub-processing elements in the first direction, and receive second input data of row vectors of a corresponding one of the k second input m×m matrices, a plurality of first remaining sub-processing elements other than the plurality of first column sub-processing elements provided in a first column, among the m×m among the plurality of sub-processing elements of each of the k partial systolic arrays, receive second input data applied through a front-end processing element provided preceding the respective sub-processing element in the first direction, and each of the plurality of sub-processing elements of each of the k partial systolic arrays multiplies the received second input data and the stored second weight data to obtain second multiplication results, accumulates the second multiplication results to obtain a fourth partial accumulation result, adds the fourth partial accumulation result to a fifth partial accumulation result transmitted from a respective front-end processing element preceding the respective sub-processing element in the second direction to obtain a sixth partial accumulation result, and transmits the sixth partial accumulation result to a rear-end processing element succeeding the respective sub-processing element in the third direction or to an outside.

7. The systolic array according to claim 1, wherein each of the plurality of processing elements comprises:

a multiplier configured to multiply the first input data by the first weight data to generate first multiplication results or to multiply the second input data by the second weight data to generate the second multiplication results; and a partial accumulator configured to:
accumulate the first multiplication results to generate a first partial accumulation result, and accumulate the first partial accumulation result and a second partial accumulation result to generate a third partial accumulation result, or accumulate the second multiplication results to generate a fourth partial accumulation result, and accumulate the fourth partial accumulation result and a fifth partial accumulation result to generate a sixth partial accumulation result.

8. The systolic array according to claim 7, wherein each of plurality of sub-processing elements provided in the first column of the m×m matrix, among the plurality of sub-processing elements of each of the k partial systolic arrays that do not comprise the plurality of first column processing elements provided in the first column of the n×n matrix, further comprises a first selector configured to receive the first input data transmitted through front-end processing elements provided preceding respective sub-processing element in a first direction during the first convolution operation and to receive the second input data of a corresponding row vector of a corresponding one of the k second input m×m matrices during the second convolution operation.

9. The systolic array according to claim 8, wherein each of the plurality of sub-processing elements provided in an m-th row of the m×m matrix, among the plurality of sub-processing elements of each of the k partial systolic arrays, further comprises a second selector configured to transmit the third partial accumulation result to a rear-end processing element provided succeeding the respective sub-processing element in a third direction during the first convolution operation and to transmit the sixth partial accumulation result not to the rear-end processing element provided succeeding the respective sub-processing element in the third direction and transmit the sixth partial accumulation result to an outside during the second convolution operation.

10. The systolic array according to claim 9, wherein each of the plurality of sub-processing elements provided in the first row of the processing elements of each of the k partial systolic arrays that do not comprise the n processing elements provided in the first row of the n×n matrix, among the plurality of processing elements, further comprises a third selector configured to receive the first weight data transmitted through front-end processing elements provided preceding respective sub-processing element in a second direction during the first convolution operation and to receive the second weight data of a corresponding column vector of a corresponding one of the k second weight m×m matrices during the second convolution operation.

11. An accelerator comprising:
a systolic array comprising a plurality of processing elements provided in an n×n matrix, the plurality of processing elements configured to perform:
in response to a control signal, a first convolution operation on first input data of n row vectors of a first input n×n matrix and first weight data of n column vectors of a first weight n×n matrix to generate n first output data, or
divide operation of the plurality of processing elements into k partial systolic arrays, each of the k partial systolic arrays comprising a plurality of sub-processing elements provided in an m×m matrix, and
perform a second convolution operation on second input data of row vectors of k second input m×m matrices, each corresponding one of the k partial systolic arrays and second weight data of column vectors of k second weight m×m matrices, each corresponding one of the k partial systolic arrays, to generate m second output data, wherein n is an integer greater than or equal to 4, wherein k is an integer greater than or equal to 4, and wherein m is an integer less than n, and m is greater than or equal to 2;
an accumulator configured to accumulate the n first output data to generate first convolution result data or to accumulate the m second output data generated from each of the k partial systolic arrays to generate at least k second convolution result data in response to the control signal;
an input data generator configured to generate the first input data of the n row vectors of the first input n×n matrix or to generate the second input data of the m row vectors of each of the k second input m×m matrices in response to the control signal; and
a weight data generator configured to generate the first weight data of the n column vectors of the first weight n×n matrix or to generate the second weight data of the m column vectors of each of the k second weight m×m matrices in response to the control signal,
wherein each of the plurality of processing elements comprises:
a first multiplexer configured to select and output, as a selected output data, one of the first input data of row vectors during the first convolution operation, and one of the second input data of row vectors during the second convolution operation,
a second multiplexer configured to select and output, as a selected output weight, one of the first weight data of column vectors during the first convolution operation, and one of the second weight data of column vectors during the second convolution operation,
a first register configured to store the selected output data from the first multiplexer,
a second register configured to store the selected output weight from the second multiplexer,
a multiplier configured to multiply the selected output data from the first register and the selected output weight from the second register,
a partial accumulator configured accumulate multiplication results output from the multiplier to generate a partial accumulation result, and
a demultiplexer configured to transmit an output from the partial accumulator to a rear-end processing elements disposed at the downside or to the accumulator.

12. The accelerator according to claim 11, wherein the control signal is related to a number m.

13. The accelerator according to claim 11, wherein the input data generator is configured to sequentially generate the n first input data of the n row vectors of the first input n×n matrix in a state of being delayed by one cycle or to sequentially generate the m second input data of the m row vectors of each of the second input matrices in a state of being delayed by one cycle in response to the control signal.

14. The accelerator according to claim 13, wherein the weight data generator is configured to sequentially generate the n first weight data of the n column vectors of the first n×n weight matrix in a state of being delayed by one cycle or to sequentially generate the m second weight data of the m column vectors of each of the second weight m×m matrices in a state of being delayed by one cycle.

15. The accelerator according to claim 11, wherein, during the first convolution operation,
each of a plurality of first column processing elements provided in a first column of the n×n matrix, among the plurality of processing elements, receives a corresponding one of first input data of n row vectors of the first input n×n matrix,
each of a plurality of first row processing elements provided in a first row of the n×n matrix, among the plurality of processing elements, receives a corresponding one of first weight data of n column vectors of the first weight n×n matrix,
a first remaining processing elements other than the plurality of first column processing elements provided in the first column of the n×n matrix, among the plurality of processing elements, receive first input data applied through a front-end processing element provided preceding the respective processing element in a first direction,
a second remaining processing elements other than the plurality of first row processing elements provided in the first row of the n×n matrix, among the plurality of processing elements, receive first weight data applied through a front-end processing element provided preceding the respective processing element in a second direction, and
each of the plurality of processing elements multiplies the received first input data by the received first weight data to obtain first multiplication results, accumulates the first multiplication results to obtain a first partial accumulation result, adds the first partial accumulation result to a second partial accumulation result transmitted from the front-end processing element preceding the respective processing element in the second direction to obtain a third partial accumulation result, and transmits the third partial accumulation result to a rear-end processing element succeeding the respective processing element in a third direction.

16. The accelerator according to claim 15, wherein, during the second convolution operation,
a plurality of first column sub-processing elements provided in a first column of the m×m matrix, among the plurality of sub-processing elements of each of the k partial systolic arrays that do not comprise the plurality of first column processing elements provided in the first column of the n×n matrix, do not receive second input data transmitted through front-end processing elements provided preceding respective sub-processing element in the first direction, and receive second input data of row vectors of a corresponding one of the k second input m×m matrices, a plurality of first row sub-processing elements provided in a first row of the m×m matrix, among the plurality of sub-processing elements of each of the k partial systolic arrays that do not comprise the plurality of first row processing elements provided in the first row of the n×n matrix, do not receive second weight data transmitted through front-end processing elements provided preceding the respective sub-processing element in the second direction, and receive second weight data of column vectors of a corresponding one of the k second input m×m matrices, a plurality of first remaining sub-processing elements other than the plurality of first column sub-processing elements provided in the first column of the m×m matrix, among the plurality of sub-processing elements of each of the k partial systolic arrays, receive second input data applied through a front-end processing element provided preceding the respective sub-processing element in the first direction, a plurality of second remaining sub-processing elements other than the plurality of first row sub-processing elements provided in a first row matrix, among the plurality of sub-processing elements of each of the k partial systolic arrays, receive second weight data applied through a front-end processing element provided preceding the respective sub-processing element in the second direction, and each of the plurality of sub-processing elements of each of the k partial systolic arrays multiplies the received second input data by the received second weight data to obtain second multiplication results, accumulates the second multiplication results to obtain a fourth partial accumulation result, adds the fourth partial accumulation result to a fifth partial accumulation result transmitted from a respective front-end processing element preceding the respective sub-processing element in the second direction to obtain a sixth partial accumulation result, and transmits the sixth partial accumulation result to a rear-end processing element succeeding the respective sub-processing element in the third direction or to the accumulator.

17. The accelerator according to claim 15, wherein, during the second convolution operation, second weight data of a second weight matrix, among the k second weight m×m matrices, are stored in advance in the plurality of sub-processing elements of each of the k partial systolic arrays, a plurality of first column sub-processing elements provided in a first column of the m×m matrix, among the plurality of sub-processing elements of each of the partial systolic arrays comprising the plurality of first column processing elements provided in the first column of the n×n matrix, receive second input data of row vectors of a corresponding one of the k second input m×m matrices, a plurality of first column sub-processing elements provided in a second column of the m×m matrix, among the plurality of sub-processing elements of each of the k partial systolic arrays that do not comprise the plurality of first column processing elements provided in the first column of the n×n matrix, do not receive second input data transmitted through front-end processing elements provided preceding the respective first remaining sub-processing elements in the first direction, and receive second input data of row vectors of a corresponding one of the k second input m×m matrices, a plurality of first remaining sub-processing elements other than the plurality of first column sub-processing elements provided in a first column, among the m×m among the plurality of sub-processing elements of each of the k partial systolic arrays, receive second input data applied through a front-end processing element provided preceding the respective sub-processing element in the first direction, and each of the plurality of sub-processing elements of each of the k partial systolic arrays multiplies the received second input data and the stored second weight data to obtain second multiplication results, accumulates the second multiplication results to obtain a fourth partial accumulation result, adds the fourth partial accumulation result to a fifth partial accumulation result transmitted from a respective front-end processing element preceding the respective sub-processing element in the second direction to obtain a sixth partial accumulation result, and transmits the sixth partial accumulation result to a rear-end processing element succeeding the respective sub-processing element in the third direction or to the accumulator.

18. The accelerator according to claim 11, wherein each of the plurality of processing elements comprises:

a multiplier configured to multiply the first input data by the first weight data to generate first multiplication results or to multiply the second input data by the second weight data to generate second multiplication results; and a partial accumulator configured to:
 accumulate the first multiplication results to generate the first partial accumulation result, and accumulate the first partial accumulation result and a second partial accumulation result to generate a third partial accumulation result, or
 accumulate the second multiplication results to generate a fourth partial accumulation result, and accumulate the fourth partial accumulation result and a fifth partial accumulation result to generate a sixth partial accumulation result.

19. The accelerator according to claim 18, wherein each of plurality of sub-processing elements provided in the first column of the m×m matrix, among the plurality of sub-processing elements of each of the k partial systolic arrays that do not comprise the plurality of first column processing elements provided in the first column of the n×n matrix, further comprises a first selector configured to receive the first input data transmitted through front-end processing elements provided preceding respective sub-processing element in a first direction during the first convolution operation and to receive the second input data of a corresponding row vector of a corresponding one of the k second input m×m matrices during the second convolution operation, and each of the plurality of sub-processing elements provided in an m-th row of the m×m matrix, among the plurality of sub-processing elements of each of the k partial systolic arrays, further comprises a second selector configured to transmit the third partial accumulation result to a rear-end processing element provided succeeding the respective sub-processing element in a third direction during the first convolution operation and to transmit the sixth partial accumulation result not to the rear-end processing element provided succeeding the respective sub-processing element in the third direction and transmit the sixth partial accumulation result to the accumulator during the second convolution operation.

20. The accelerator according to claim 19, wherein each of the plurality of sub-processing elements provided in the first row of the m×m processing elements of each of the k partial systolic arrays that do not comprise the n processing elements provided in the first row of the n×n matrix, among the plurality of processing elements, further comprises a third selector configured to receive the first weight data transmitted through front-end processing elements provided preceding respective sub-processing element in a second direction during the first convolution operation and to receive the second weight data of a corresponding column vector of a corresponding one of the k second weight m×m matrices during the second convolution operation.

* * * * *